US012476040B2

(12) United States Patent
Matsui et al.

(10) Patent No.: US 12,476,040 B2
(45) Date of Patent: Nov. 18, 2025

(54) COIL COMPONENT, CIRCUIT BOARD, AND ELECTRONIC DEVICE

(71) Applicant: TAIYO YUDEN CO., LTD., Tokyo (JP)

(72) Inventors: Motoki Matsui, Tokyo (JP); Tomoo Kashiwa, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 880 days.

(21) Appl. No.: 17/707,556

(22) Filed: Mar. 29, 2022

(65) Prior Publication Data

US 2022/0328241 A1 Oct. 13, 2022

(30) Foreign Application Priority Data

Mar. 31, 2021 (JP) ................................ 2021-061661

(51) Int. Cl.

*H01F 17/04* (2006.01)
*H01F 1/147* (2006.01)
*H01F 27/255* (2006.01)
*H01F 27/29* (2006.01)

(52) U.S. Cl.

CPC ....... *H01F 27/292* (2013.01); *H01F 1/14766* (2013.01); *H01F 27/255* (2013.01)

(58) Field of Classification Search

CPC .................................................... H01F 27/292
USPC .................................................. 336/221, 233
See application file for complete search history.

(56) References Cited

U.S. PATENT DOCUMENTS

2019/0392978 A1* 12/2019 Matsuura ................ H01F 27/02
2021/0225575 A1* 7/2021 Jeon ........................ H01F 27/32

FOREIGN PATENT DOCUMENTS

JP 2017-183655 A 10/2017

OTHER PUBLICATIONS

English translation of WO2016031993 (Year: 2016).*

* cited by examiner

*Primary Examiner* — Ronald Hinson
(74) *Attorney, Agent, or Firm* — Pillsbury Winthrop Shaw Pittman, LLP

(57) ABSTRACT

A coil component includes a base body, a coil conductor disposed in or on the base body, a first external electrode electrically connected to the coil conductor, and a second external electrode electrically connected to the coil conductor. The base body includes a first metal magnetic particle group and a second metal magnetic particle group. The first metal magnetic particle group is composed of plural first metal magnetic particles each including Fe, and the second metal magnetic particle group is composed of plural second metal magnetic particles each including Fe. The first metal magnetic particle group has a first average particle size and a first degree of circularity of 0.75 or higher. The second metal magnetic particle group has a second average particle size smaller than the first average particle size and a second average degree of circularity larger than the first average degree of circularity.

14 Claims, 7 Drawing Sheets

COIL COMPONENT, CIRCUIT BOARD, AND ELECTRONIC DEVICE

CROSS-REFERENCE TO RELATED APPLICATIONS

This application is based on and claims the benefit of priority from Japanese Patent Application Serial No. 2021-61661 (filed on Mar. 31, 2021), the contents of which are hereby incorporated by reference in its entirety.

TECHNICAL FIELD

The present disclosure relates to a coil component, a circuit board, and an electronic device.

BACKGROUND

A soft magnetic metal material has been known as a magnetic material for a coil component. The soft magnetic metal material has a higher saturation magnetic flux density than a ferrite material and is therefore particularly suitable for the material of a base body of a coil component through which a large number of current flows. The base body includes a soft magnetic metal material in the form of metal magnetic particles. The metal magnetic particles are produced by granulating a soft magnetic metal material. Most of the metal magnetic particles have a particle size from several nanometers to several micrometers. A surface of each of the metal magnetic particles included in the base body is formed with an insulating film for preventing a short circuit between adjacent metal magnetic particles.

The base body including metal magnetic particles is produced by mixing and kneading metal magnetic particles with a resin to obtain a resin composition mixture, pouring the resin composition mixture into a cavity of a mold, and performing a compression molding process by which a pressure is applied to the resin composition mixture in the mold.

The base body of a coil component is required to have high magnetic permeability. As disclosed in Japanese Patent Application Publication 2017-183655 ("the '655 Publication"), it is known that the magnetic permeability of a base body can be improved by application of a larger molding pressure in a compression molding process to increase the filling rate of metal magnetic particles included in the base body, thereby improving the magnetic permeability of the base body. The '655 Publication points out that the magnetic permeability is reduced if the molding pressure is low. Therefore, in the '655 Publication, a relatively high molding pressure around 600 MPa is applied in the compression molding process. Although the molding pressure can be changed according to a required magnetic permeability, it has been considered as desirable that the compression molding should be performed with a molding pressure of about 400 MPa to about 800 MPa.

When a magnetic material including metal magnetic particles is subjected to a compression molding with a molding pressure of about 400 MPa to about 800 MPa, the metal magnetic particles included in the magnetic material are deformed. For example, FIG. 1 of the '655 Publication shows a photograph of a cross section of a base body including deformed metal magnetic particles.

The metal magnetic particles are deformed by a compression molding process or other process to have a low degree of circularity and stress strain is generated in the metal magnetic particles. There is a problem that the base body including deformed metal magnetic particles has reduced magnetic permeability due to the stress strain generated in metal magnetic particles. If the magnetic material is compressed with a higher molding pressure, the stress strain generated in the metal magnetic particles becomes larger, causing the magnetic permeability of the base body to be reduced to a larger degree. Therefore, the increase of the magnetic permeability by application of a larger molding pressure is offset to at least some extent by reduction of the magnetic permeability due to the stress strain generated in metal magnetic particles. Furthermore, the deformation of metal magnetic particles causes the insulation property between metal magnetic particles to be reduced Therefore, there is a problem that the dielectric strength voltage of a magnetic base body is reduced if the molding pressure is increased to improve the magnetic permeability. Furthermore, the core loss is larger as larger stress strain is generated in the metal magnetic particles.

SUMMARY

An object of the invention disclosed in this specification is to relieve or reduce at least a part of the above problem. One specific object of the invention disclosed in this specification is to provide a new coil component that can improve the dielectric strength voltage of a base body by suppressing reduction of the insulation property between metal magnetic particles caused by stress strain generated in the metal magnetic particles.

The other objects of the invention disclosed in this specification will be apparent with reference to the entire description in this specification. The invention herein may solve any other drawbacks grasped from the following description, instead of or in addition to the above drawback.

A coil component according to at least one embodiment of the present invention comprises: a base body; a coil conductor disposed in or on the base body; a first external electrode electrically connected to the coil conductor; and a second external electrode electrically connected to the coil conductor. In at least one embodiment of the present invention, the base body includes a first metal magnetic particle group and a second metal magnetic particle group. The first metal magnetic particle group is composed of plural first metal magnetic particles each including Fe. The second metal magnetic particle group is composed of plural second metal magnetic particles each including Fe. The first metal magnetic particle group has a first average particle size and a first average degree of circularity of 0.75 or higher. The second metal magnetic particle group has a second average particle size smaller than the first average particle size and a second average degree of circularity larger than the first average degree of circularity.

In at least one embodiment of the present invention, a strength of each of the plural second metal magnetic particles is larger than a strength of each of the plural first metal magnetic particles.

In at least one embodiment of the present invention, the first average particle size is equal to or larger than quintuple of the second average particle size.

In at least one embodiment of the present invention, a weight proportion of the plural first metal magnetic particles in the base body is larger than a weight proportion of the plural second metal magnetic particles in the base body.

In at least one embodiment of the present invention, each of the plural first metal magnetic particles includes Si.

In at least one embodiment of the present invention, each of the plural second metal magnetic particles includes Si, and a content proportion of Si included in the plural first metal magnetic particles is higher than a content proportion of Si included in the plural second metal magnetic particles.

In at least one embodiment of the present invention, the base body includes a resin.

In at least one embodiment of the present invention, the coil conductor includes a circling portion extending around a coil axis, and the base body includes a core area on a radially inner side of the circling portion and a margin area on a radially outer side of the circling portion. In at least one embodiment of the present invention, the first average degree of circularity in the core area is larger than the first average degree of circularity in the margin area. In at least one embodiment of the present invention, the second average degree of circularity in the core area is larger than the second average degree of circularity in the margin area.

In at least one embodiment of the present invention, the base body includes a third metal magnetic particle group composed of plural third metal magnetic particles each including Fe. The third metal magnetic particle group has a third average particle size smaller than the second average particle size. In at least one embodiment of the present invention, the plural third metal magnetic particles have a third average degree of circularity lower than the second average degree of circularity.

A circuit board according to one aspect of the present invention comprises any of the above-described coil components and a mounting board connected to the first external electrode and the second external electrode by soldering.

An electronic device according to one aspect of the present invention comprises the above-described circuit board.

According to at least one embodiment of the present invention, it is possible to improve magnetic permeability of the base body by suppressing reduction of the magnetic permeability caused by stress strain generated in the metal magnetic particles.

DESCRIPTION OF THE EMBODIMENTS

Figure 1:
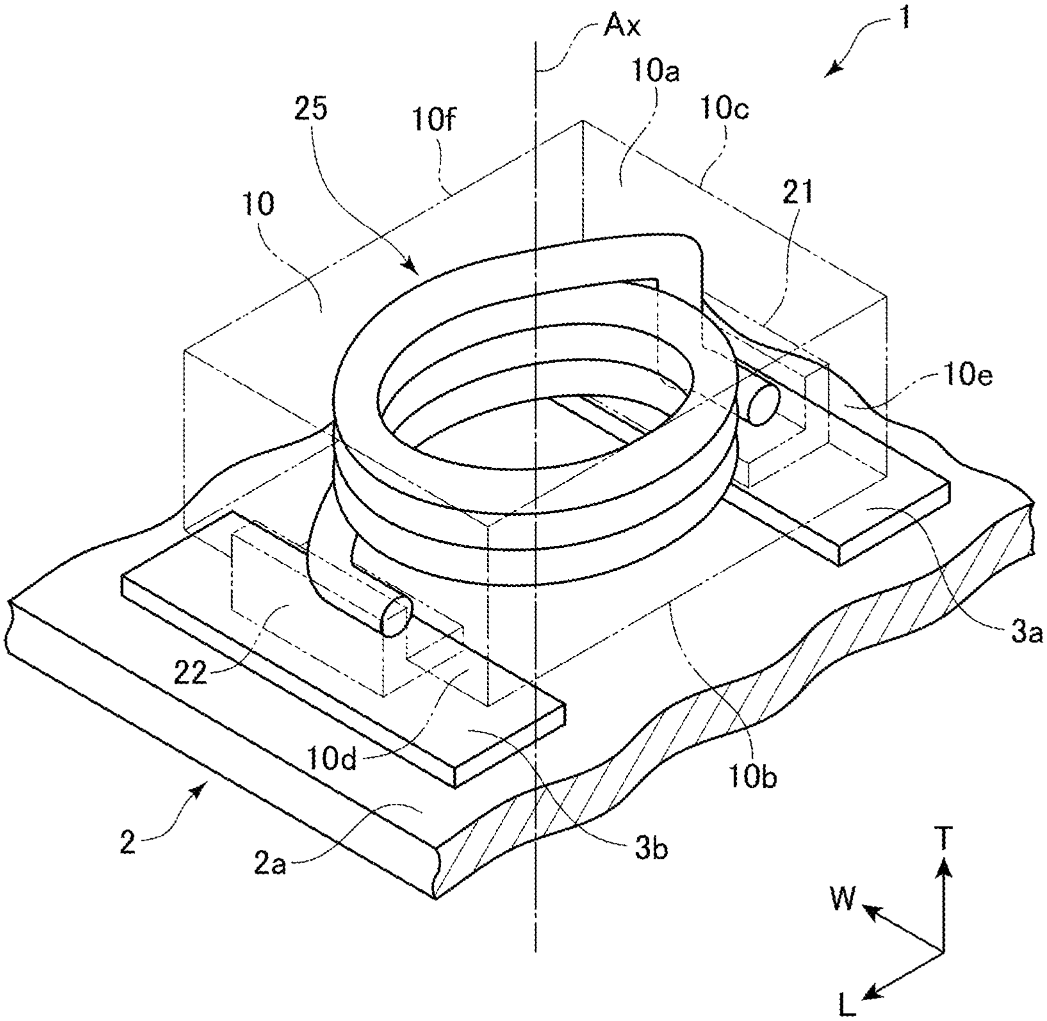
FIG. 1 is a perspective view schematically showing a coil component according to one embodiment of the present invention.

Various embodiments of the present invention will be described hereinafter with reference to the appended drawings. Throughout the drawings, the same components are denoted by the same reference numerals. It should be noted that the drawings do not necessarily appear in accurate scales for convenience of description. The following embodiments of the present invention do not limit the scope of the claims. The elements described in the following embodiments are not necessarily essential to solve the problem to be solved by the invention.

Figure 2:
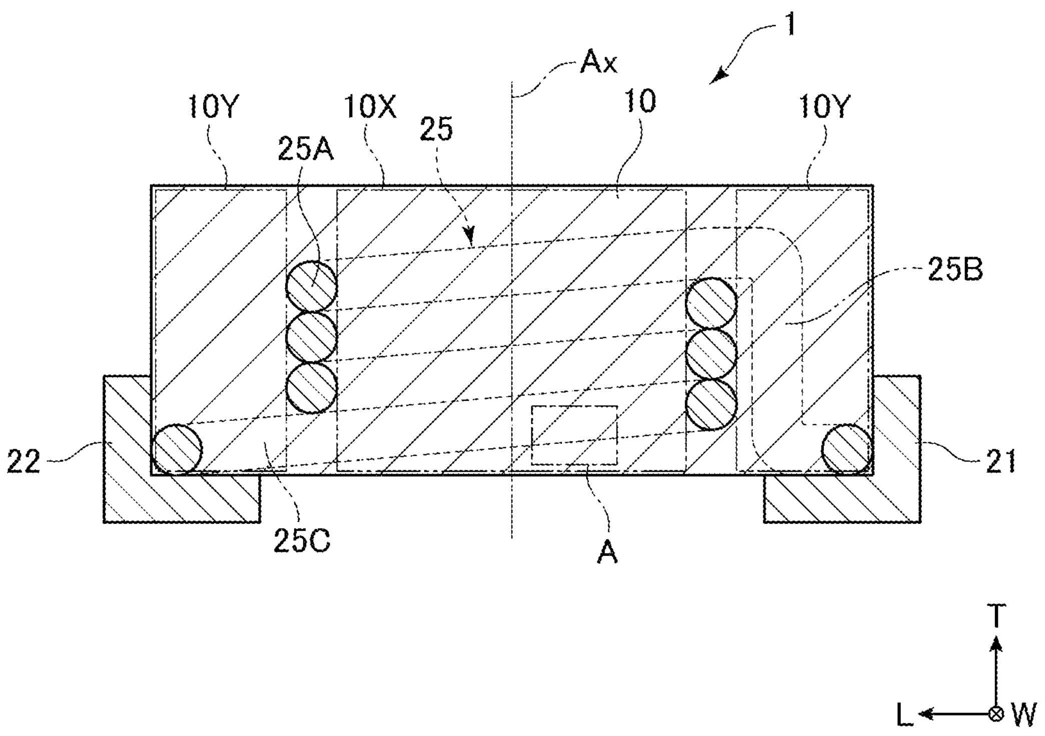
FIG. 2 is a cross sectional view of the coil component of FIG. 1.

A coil component 1 according to one embodiment of the present invention will be described with reference to FIGS. 1 to 2. FIG. 1 is a perspective view schematically showing the coil component 1. FIG. 2 is a cross sectional view schematically showing a cross section of the coil component 1. As shown, the coil component 1 includes a base body 10, a coil conductor 25 disposed in the base body 10, an external electrode 21 disposed on a surface of the base body 10, and an external electrode 22 disposed on a surface of the base body 10 at a location spaced apart from the external electrode 21. The base body 10 includes a magnetic material.

In this specification, unless otherwise construed from the context, the "length" direction, the "width" direction, and the "thickness" direction of the coil component 1 may be herein referred to as the "L axis" direction, the "W axis" direction, and the "T axis" direction, respectively. The "thickness" direction may be also referred to as the "height" direction. The L axis, the W axis, and the T axis are perpendicular to each other.

The coil component 1 may be mounted on a mounting substrate 2*a*. The mounting substrate 2*a* has land portions 3*a*, 3*b* provided thereon. The coil component 1 is mounted on the mounting substrate 2*a* by connecting the external electrode 21 to the land portion 3*a* and connecting the external electrode 22 to the land portion 3*b*. A circuit board 2 according to one embodiment of the present invention includes the coil component 1 and the mounting substrate 2*a* having the coil component 1 mounted thereon. The circuit board 2 can be mounted in various electronic devices. The electronic devices in which the circuit board 2 can be installed include smartphones, tablets, game consoles, electrical components of automobiles, a server, and various other electronic devices. For clarity, the mounting substrate 2*a* and the land portions 3*a*, 3*b* are not shown in the drawings other than FIG. 1.

The coil component 1 may be an inductor, a transformer, a filter, a reactor and any one of various other coil components. The coil component 1 may alternatively be a coupled inductor, a choke coil, and any one of various other magnetically coupled coil components. The coil component 1 may be, for example, an inductor used in a DC/DC converter. Applications of the coil component 1 are not limited to those explicitly described herein.

The base body 10 is made of magnetic material and formed in a substantially rectangular parallelepiped shape. In one embodiment of the present invention, the base body 10 is configured to have a dimension in the L-axis direction (length dimension) larger than a dimension in the W-axis direction (width dimension) W1 and a dimension in the T-axis direction (height dimension) T1. For example, the length dimension is from 1.0 mm to 6.0 mm, the width dimension is from 0.5 mm to 4.5 mm, and the height dimension is from 0.5 mm to 4.5 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense. The dimensions and the shape of the base body 10 are not limited to those specified herein.

The base body 10 has a first principal surface 10*a*, a second principal surface 10*b*, a first end surface 10*c*, a second end surface 10*d*, a first side surface 10*e*, and a second side surface 10*f*. The outer surface of the base body 10 is defined by these six surfaces. The first principal surface 10*a* and the second principal surface 10*b* are at the opposite ends in the height direction of the base body 10, the first end surface 10*c* and the second end surface 10*d* are at the opposite ends in the length direction of the base body 10, and the first side surface 10*e* and the second side surface 10*f* are at the opposite ends in the width direction of the base body 10. The top surface 10*a* is spaced apart from the bottom surface 10*b* with the height dimension, the first end surface 10*c* is spaced apart from the second end surface 10*d* with the length dimension, and the first side surface 10*e* is spaced apart from the second side surface 10*f* with the width dimension. As shown in FIG. 1, the first principal surface 10*a* lies on the top side of the magnetic base body 10, and therefore, the first principal surface 10*a* may be herein referred to as "the top surface." Likewise, the second principal surface 10*b* may be referred to as "the bottom surface." The coil component 1 is disposed such that the second principal surface 10*b* faces the mounting substrate 2*a*, and therefore, the second principal surface 10*b* may be herein referred to as "the mounting surface."

In one embodiment of the present invention, the external electrode 21 extends on the mounting surface 10*b* and the end surface 10*c* of the base body 10. The external electrode 22 extends on the mounting surface 10*b* and the end surface 10*d* of the base body 10. The external electrode 21 and the external electrode 22 are separated from each other in the length direction. The shapes and positions of the external electrodes 21, 22 are not limited to those in the example shown. The external electrodes 21, 22 may be formed by applying a conductive paste onto the surface of the base body 10. The conductive paste includes metal particles made of Ag, Cu, or the like that has a good electrical conductivity. The external electrodes 21, 22 may include plated layers. The plated layer may include two or more layers. The two-layered plated layer may include a Ni plated layer and a Sn plated layer disposed on an outer side of the Ni plated layer.

The coil conductor 25 includes a circling portion 25A spirally extending around the coil axis Ax extending along the thickness direction (T-axis direction), a lead-out portion 25B connecting one end of the circling portion 25A to the external electrode 21, and a lead-out portion 25C connecting the other end of the circling portion 25A to the external electrode 22. In the illustrated embodiment, the coil conductor 25 has opposite ends exposed out of the base body 10, and all the other portions of the coil conductor 25 are disposed inside the base body 10. In the illustrated embodiment, the coil axis Ax intersects the first principal surface 10*a* and the second principal surface 10*b* but does not intersect the first end surface 10*c*, the second end surface 10*d*, the first side surface 10*e*, and the second side surface 10*f*. In other words, the first end surface 10*c*, the second end surface 10*d*, the first side surface 10*e*, the second side surface 10*f* extend along the coil axis Ax. In one embodiment, the coil axis AX passes through the intersection of two diagonal lines of the base body 10 in a planar view of the base body 10. The shape of the coil conductor 25 is not limited to the illustrated one. For example, in a planar view (as viewed from the T-axis direction), the coil conductor 25 may extend around the coil axis Ax by less than a single turn. The shape of the coil conductor 25 in a planar view may be oval, meandering, linear, or a shape of combination of these.

When the base body 10 is viewed from a direction of the coil axis Ax, an area on an inner side of the circling portion 25A is taken as a core area 10X, and an area on an outer side of the circling portion 25A is taken as a margin area 10Y. In a planar view, if the coil conductor 25 extends around the coil axis Ax by less than a single turn but has a portion extending around the coil axis Ax by a ⅔ turn or greater (240° or greater in a planar view), that portion extending around the coil axis Ax by a ⅔ turn or greater can be considered as the circling portion 25A. In this case, the area of the base body 10 which is on the inner side of the circling portion 25A of the coil conductor 25 extending around the coil axis Ax by less than a single turn can be considered as the core area 10X, and the area of the base body 10 on the outer side of the circling portion 25A can be considered as the margin area 10Y.

The coil conductor 25 may not have a circling portion extending around the coil axis Ax by a ⅔ turn or greater (240° or greater in a planar view) but may have such a portion that extends in a circumferential direction around any axis line extending in parallel to the T axis by a ⅔ turn or greater (for example, when the shape of the coil conductor 25 in a planar view is meandering). In this case, an area of the base body 10 on a radially (a radial direction perpendicular to the axis line as a center) inner side of the portion extending around the axis line by a ⅔ turn or greater can be considered as the core area 10X, and an area of the base body 10 on an outer side of that portion can be considered as the margin area 10Y. If the coil conductor 25 have neither a portion extending around the coil axis Ax by a ⅔ turn or greater nor a portion extending in a circumferential direction around any axis line extending in parallel to the T axis by a ⅔ turn or greater (for example, when the shape of the coil conductor 25 in a planar view is linear), there is no area that can be considered as the core area 10X or the margin area 10Y.

The surface of the coil conductor 25 may be covered by an insulating layer composed of insulating material having a good insulation property. This insulating layer may be composed of resin having a good insulation property such as polyurethane, polyamide imide, polyimide, polyester, polyester imide. The base body 10 may include a substrate composed of insulation material having a good insulation property, and the coil conductor 25 may be formed on the substrate.

Figure 3:
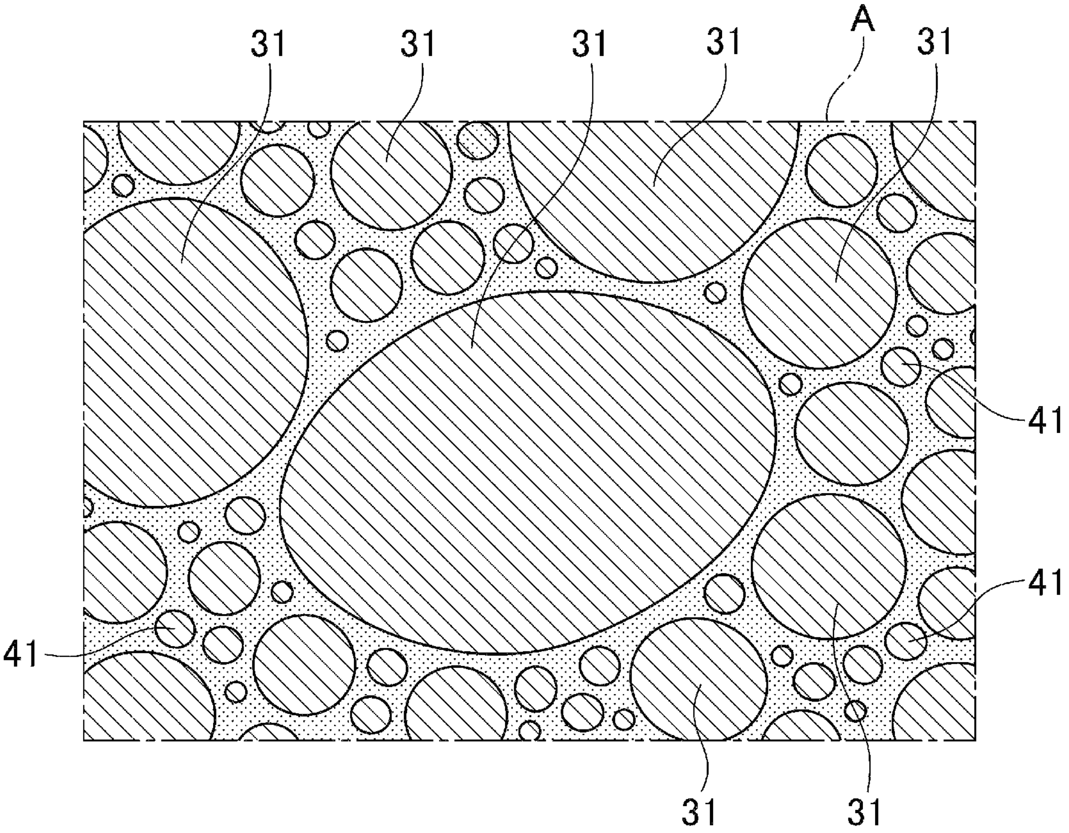
FIG. 3 is a schematic enlarged view of the region A of the base body shown in FIG. 2.

In one embodiment of the present invention, the base body 10 is composed of plural metal magnetic particles including a magnetic material. The microstructure of the base body 10 will now be described with reference to FIG. 3. FIG. 3 is an enlarged sectional view schematically showing a cross section of the base body 10. Specifically, FIG. 3 is an enlarged view of the region A shown in FIG. 2. FIG. 2 shows a cross section of the coil component 1 cut along a plane extending along the coil axis Ax, and the region A is a part of the cross section of the base body 10 shown in FIG. 2.

As shown in FIG. 3, the base body 10 in one embodiment includes plural first metal magnetic particles 31 and plural second metal magnetic particles 41. In this specification, the plural first metal magnetic particles 31 included in the base body 10 may be referred to as a first metal magnetic particle group, and the plural second metal magnetic particles 41 included in the base body 10 may be referred to as a second metal magnetic particle group. Specifically, the first metal magnetic particle group is composed of plural first metal magnetic particles 31, and the second metal magnetic particle group is composed of plural second metal magnetic particles 41. Depending on the context of this specification, when the first metal magnetic particles 31 and the second metal magnetic particles 41 need not be distinguished from each other, the both may be referred to as "metal magnetic particles", for convenience of explanation.

The first metal magnetic particles 31 and the second metal magnetic particles 41 are composed of soft magnetic metal material, respectively. The soft magnetic metal material of the first metal magnetic particles 31 and the second metal magnetic particles 41 may be, for example, (1) metal Fe, (2) Fe—Si—Cr alloy, Fe—Si—Al alloy, or Fe—Ni alloy, or Ni alloy, (3) amorphous Fe—Si—Cr-B-C or Fe—Si—B—Cr, (4) other metal such as Fe—B—P—Cu, Fe—Si—B—P—Cu, or Fe—Co—Zr—B—Cu, or (5) a mixed material obtained by mixing these materials. The soft magnetic metal material of the first metal magnetic particles 31 and the second metal magnetic particles 41 is not limited to the above-described materials. For example, the soft magnetic metal material of the first metal magnetic particles 31 and the second metal magnetic particles 41 may include at least one element selected from Zr, Nb, Cu, and P, other than the above-described elements. In at least one embodiment of the present invention, a content proportion of Fe required for a total of the first metal magnetic particles 31 and the second metal magnetic particles 41 is 80 wt. % or greater.

In at least one embodiment of the present invention, the composition of the first metal magnetic particle 31 may differ from the composition of the second metal magnetic particle 41. For example, the first metal magnetic particle 31 may include an element that is not included in the second metal magnetic particle 41. For example, both the first metal magnetic particle 31 and the second metal magnetic particle 41 may include Fe and Si, and either one of the two metal magnetic particles may include at least one of Nb, Cu and Cr. For example, each of the first metal magnetic particles 31 composing the first metal magnetic particle group may include Fe, Si, Nb, Cu, B, and C, and each of the second metal magnetic particles 41 composing the second metal magnetic particle group may include Fe, Si, Cr, B, and C. In this case, Nb and Cu included in the first metal magnetic particle 31 are not included in the second metal magnetic particle 41, and Cr included in the second metal magnetic particle 41 is not included in the first metal magnetic particle 31. Accordingly, in at least one embodiment, the first metal magnetic particle 31 can be distinguished from the second metal magnetic particle 41 according to the difference of the elements they include.

In at least one embodiment of the present invention, the first metal magnetic particle 31 may be distinguished from the second metal magnetic particle 41 based on a difference in a composition ratio of the elements included in both the first metal magnetic particle 31 and the second metal magnetic particle 41. For example, in at least one embodiment of the present invention, in a case where both the first metal magnetic particle 31 and the second metal magnetic particle 41 include Si, the content proportion of Si included in the first metal magnetic particle 31 may be higher than the content proportion of Si included in the second metal magnetic particle 41.

In at least one embodiment of the present invention, a strength of each of the second metal magnetic particles 41 is larger than a strength of each of the first metal magnetic particles 31. For example, the content proportion of Si included in the first metal magnetic particle 31 is higher than the content proportion of Si included in the second metal magnetic particle 41, thereby allowing the strength of each of the first_metal magnetic particles 31 to be larger than the strength of each of the second metal magnetic particles 41.

In another embodiment of the present invention, the strength of each of the first metal magnetic particles 31 may be larger than the strength of each of the second metal magnetic particles 41. This suppresses deformation of the first metal magnetic particles 31 which are more susceptible to a molding pressure at the time of manufacturing the base body 10 by a compression molding process.

The "strength" of the metal magnetic particle in this specification may denote a deformation strength where the metal magnetic particle is plastically deformed or a deformation strength where the metal magnetic particle is elastically deformed. The deformation strength of the metal magnetic particle represents a strength which is required for deformation when the metal magnetic particle is compressed. The strength of the metal magnetic particle is an index representing resistance to deformation of the metal magnetic particle and denote, for example, a deformation strength that can be measured according to JIS Z 8844:2019. The strength of the first metal magnetic particle 31 and the second metal magnetic particle 41 can be measured by a commercially available compression tester (for example, MCT510 manufactured by SHIMADZU CORPORATION). For example, for each of the plural first metal magnetic particles 31, a deformation strength with respect to compression displacement in 10% of the particle size is obtained. An average value of the deformation strengths of these particles can be taken as the strength of the first metal magnetic particle 31. Similarly, for each of the plural second metal magnetic particles 41, a deformation strength with respect to compression displacement in 10% of the particle size is obtained. An average value of the deformation strengths of these particles can be taken as the strength of the second metal magnetic particle 41. The strengths of the first metal magnetic particle 31 and the second metal magnetic particle 41 can be measured according to the Vickers hardness. The Vickers hardness can be measured in a cross section of the base body 10 cut along the T-axis direction, and the Vickers hardness thus measured can be taken as the strength. In this case, metal magnetic particles with a size of 5 μm or greater included in the base body 10 are selected, and the selected particles are measured for the Vickers hardness. The Vickers hardness can be measured by a commercially available Micro Vickers hardness tester (for example, MMT-X7 manufactured by Matsuzawa Co., Ltd.). In at least one embodiment of the present invention, a strength of each of the first metal magnetic particles 31 is larger than a strength of each of the second metal magnetic particles 41, and therefore, the first metal magnetic particle 31 is more difficult to be deformed than the second metal magnetic particle 41. This suppresses deformation of the first metal magnetic particles 31 at the time of manufacturing the base body 10 by, for example, a compression molding method. The strength of the metal magnetic particle can be larger by raising a content proportion of Si included in the metal magnetic particle. Furthermore, the strength of the metal magnetic particle can be larger by using amorphous material for the magnetic material of the metal magnetic particles. The metal magnetic particle which is partly crystalline and amorphous in the remaining part can be formed by heating the amorphous metal magnetic particle. Such a metal magnetic particle that is partly crystalline has a larger strength. In at least one embodiment of the present invention, the strength of each of the first metal magnetic particles 31 and the strength of each of the second metal magnetic particles 41 are 500 MPa or greater, respectively. In at least one embodiment of the present invention, the Vickers hardness of each of the first metal magnetic particles 31 and the Vickers hardness of each of the second metal magnetic particles 41 is 1000 Hv or greater, respectively.

In at least one embodiment of the present invention, an average particle size of the plural first metal magnetic particles 31 (i.e., the average particle size of the first metal magnetic particle group) included in the base body 10 is larger than an average particle size of the plural second metal magnetic particles 41 (i.e., the average particle size of the second metal magnetic particle group) included in the base body 10. The average particle size of the first metal magnetic particles 31 is, for example, from 4 μm to 30 μm. The average particle size of the second metal magnetic particles 41 is, for example, from 0.2 μm to 6 μm. In this specification, the average particle size of the first metal magnetic particle group may be referred to as the first average particle size, and the average particle size of the second metal magnetic particle group may be referred to as the second average particle size. The first average particle size and the second average particle size can be obtained, for example, as follows. First, the base body 10 is cut along the T-axis direction to expose a sectional surface. The sectional surface is photographed using a scanning electron microscope (SEM) to obtain an SEM image at 2000 to 5000-fold magnification. Then, SEM-EDS mapping is performed within the visual field of the SEM image to distinguish the first metal magnetic particles 31 from the second metal magnetic particles 41. For example, the first metal magnetic particle 31 has a higher content proportion of Si than the second metal magnetic particle 41. Based on whether the content proportion of Si is higher than a predetermined value, the metal magnetic particles included in the base body 10 can be distinguished between the first metal magnetic particle 31 and the second metal magnetic particle 41. Then, the particle size distribution of the first metal magnetic particles 31 is determined based on the SEM image, and the 50th percentile of the particle size distribution can be used as the average particle size of the first metal magnetic particle group (the first average particle size). Similarly, the particle size distribution of the second metal magnetic particles 41 is determined based on the SEM image, and the 50th percentile of the particle size distribution can be used as the average particle size of the second metal magnetic particle group (the second average particle size). In at least one embodiment of the present invention, the first average particle size is equal to or larger than quintuple of the second average particle size. In at least one embodiment of the present invention, the base body 10 includes plural first metal magnetic particles 31 having a first average particle size and plural second metal magnetic particles 41 having a second average particle size smaller than the first average particle size. This allows the second metal magnetic particles 41 to intervene between the first metal magnetic particles 31, thereby increasing the filling rate of the metal magnetic particles in the base body 10.

In at least one embodiment of the present invention, the base body 10 includes the first metal magnetic particle group and the second metal magnetic particle group by a weight ratio of 60:40 to 80:20. Specifically, where the total of the mass of the first metal magnetic particle group and the second metal magnetic particle group is 100 wt. %, the base body 1 includes the first metal magnetic particle group in the range of 60 to 80 wt. % and the second metal magnetic particle group in the range of 20 to 40 wt. %. Accordingly, in the base body 10, the weight proportion of the first metal magnetic particle group is larger than the weight proportion of the second metal magnetic particle group. The base body 10 includes the first metal magnetic particles 31 having a larger particle size and a larger mass proportion, thereby increasing the magnetic permeability of the base body 10.

In at least one embodiment of the present invention, the base body 10 may include plural third metal magnetic particles (not shown) in addition to the plural first metal magnetic particles 31 and the plural second metal magnetic particles 41. The third metal magnetic particles included in the base body 10 may be referred to as a third metal magnetic particle group. The plural third metal magnetic particles have a smaller average particle size than the average particle size of the plural second metal magnetic particles 41 (the second average particle size). For example, the particle size of the plural third metal magnetic particles is 0.75 or less of the second average particle size. The average particle size of the plural third metal magnetic particles is, for example, from 0.1 μm to 3 μm. In one embodiment of the present invention, where the total of the mass of the first metal magnetic particle group, the second metal magnetic particle group, and the third metal magnetic particle group is 100 wt. %, the base body 1 may include the third metal magnetic group in the range of 0 to 5 wt. %. the composition of the third metal magnetic particle may differ from the compositions of the first metal magnetic particle 31 and the second metal magnetic particle 41. In this case, the third metal magnetic particle can be distinguished from the first metal magnetic particle 31 and the second metal magnetic particle 41 based on the difference of the elements they include. The third metal magnetic particle can be distinguished from the first metal magnetic particle 31 and the second metal magnetic particle 41 based on the difference of a composition ratio of the elements they include. The third metal magnetic particles can fill a gap between the first metal magnetic particles 31, a gap between the second metal magnetic particles 41, and a gap between the first metal magnetic particle 31 and the second metal magnetic particle 41, thereby increasing a mechanical strength of the base body 10. The base body 10 may include plural fourth metal magnetic particles. The plural fourth metal magnetic particles have a smaller average particle size than the average particle size of the plural third metal magnetic particles (the third average particle size).

In at least one embodiment of the present invention, the first average degree of circularity representing an average degree of circularity of the plural first metal magnetic particles 31 is 0.75 or higher. In at least one embodiment of the present invention, the second average degree of circularity representing an average degree of circularity of the plural second metal magnetic particles 41 is 0.8 or higher. The average degree of circularity of the plural second metal magnetic particles 41 included in the base body 10 is higher than the average degree of circularity of the plural first metal magnetic particles 31 included in the base body 10. In the base body 10, the plural first metal magnetic particles 31 have the first average degree of circularity of 0.75 or higher, and the plural second metal magnetic particles 41 have the second average degree of circularity higher than the first average degree of circularity. Therefore, stress strain generated in the first metal magnetic particles 31 and the second metal magnetic particles 41 is reduced, thereby suppressing reduction of the magnetic permeability of the base body 10 caused by increase of stress strain. As the degree of circularity of the metal magnetic particle is higher, a surface area of the metal magnetic particle is shrunk. When the second average degree of circularity of the second metal magnetic particle group is higher than the first average degree of circularity of the first metal magnetic particle group, it is possible to shrink a surface area of the second metal magnetic particle. This suppresses agglutination of the second metal magnetic particles 41. If the second metal magnetic particles 41 agglutinate, the second metal magnetic particles 41 to intervene between the first metal magnetic particles 31 are scarce. This lowers the filling rate of metal magnetic particles in the base body 10. Accordingly, the second average degree of circularity of the second metal magnetic particle group is higher than the first average degree of circularity of the first metal magnetic particle group to shrink a surface area of the second metal magnetic particle 41, thereby suppressing agglutination of the second metal magnetic particles 41. As a result, it is possible to suppress lowering of the filling rate of metal magnetic particles in the base body 10 caused by agglutination of the second metal magnetic particles 41.

The average degree of circularity of the first metal magnetic particles 31 in the base body 10 can be obtained as follows. First, similarly to the calculation of the average particle size, the base body 10 is cut to expose a sectional surface, and the sectional surface is photographed using a scanning electron microscope (SEM) to obtain an SEM image at 5000 to 50000-fold magnification. Then, SEM-EDS mapping is performed within the visual field of the SEM image to distinguish the first metal magnetic particles 31 from the second metal magnetic particles 41. As described above, based on whether the content proportion of a specific element (for example, Si) is higher than a predetermined value, the metal magnetic particles included in the base body 10 can be distinguished between the first metal magnetic particle 31 and the second metal magnetic particle 41. Then, the degree of circularity of each of the first metal magnetic particles 31 included in the SEM image is calculated using a commercially available image processing software (for example, Mac-View produced by Mountech Co., Ltd.), and the average value of the calculated degrees of circularity is taken as the first average degree of circularity. Similarly, the degree of circularity of each of the second metal magnetic particles 41 included in the SEM image is calculated, and the average value of the calculated degrees of circularity is taken as the second average degree of circularity. The magnification to obtain an SEM image can be changed according to a particle size of the first metal magnetic particle 31 and/or the second metal magnetic particle 41 to be observed.

Figure 4:
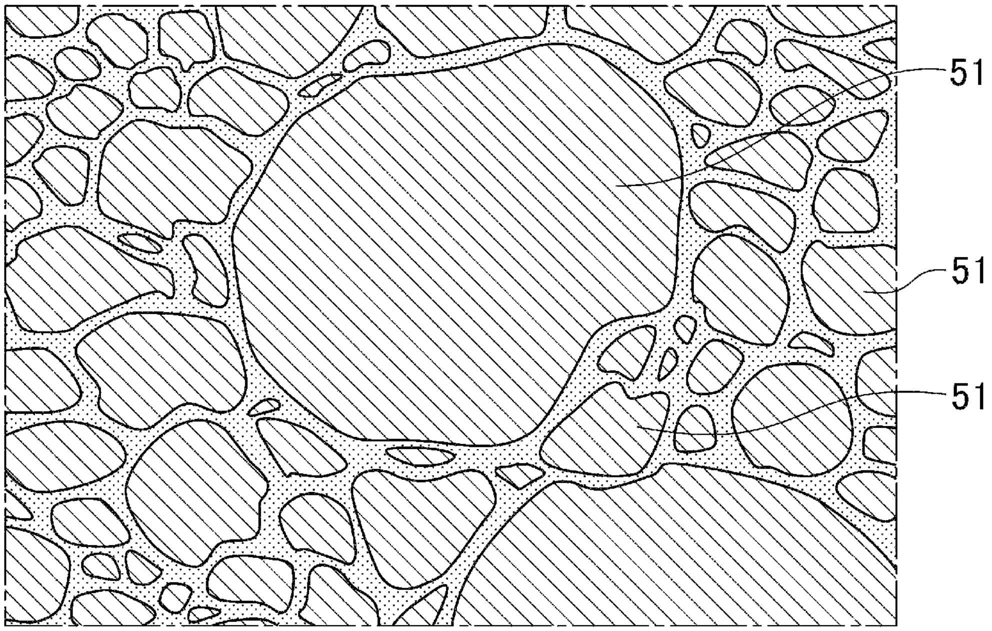
Prior Art Fig. 4
FIG. 4 is a view schematically showing a cross section of a base body of a conventional coil component.

In at least one embodiment of the present invention, the first average degree of circularity of the plural first metal magnetic particles 31 and the second average degree of circularity of the plural second metal magnetic particles 41 included in the base body 10 are 0.75 or higher, respectively. Therefore, each of the first metal magnetic particles 31 and the second metal magnetic particles 41 in a cross section of the base body 10 generally has a less complex shape (i.e., a shape close to a circle) as shown in FIG. 3. In comparison with the embodiment of the present invention, FIG. 4 shows an example of a cross section of a base body of a conventional coil component. Metal magnetic particles in the conventional coil component are compressed with a relatively high molding pressure of about 400 Mpa to about 800 Mpa, and therefore, the metal magnetic particle 51 included in the base body of the conventional coil component is deformed in the compression molding process to have a complex shape as shown in FIG. 4. When FIG. 3 is compared with FIG. 4, the first metal magnetic particles 31 and the second metal magnetic particles 41 according to the embodiment of the present invention do not have an outer periphery formed with an inwardly depressed portion, but at least some of the metal magnetic particles 51 in the conventional coil component have an outer periphery formed with an inwardly depressed portion. This depressed portion can also be identified in the photograph shown as FIG. 1 of the '655 Publication.

As described above, the base body 10 may have the core area 10X and the margin area 10Y. The first average degree of circularity in the core area 10X may differ from the first average degree of circularity in the margin area 10Y. For example, the first average degree of circularity in the core area 10X may be higher than the first average degree of circularity in the margin area 10Y. The first average degree of circularity in the core area 10X, which has a large density of magnetic flux generated by a current flowing through the coil conductor 25, is higher than the first average degree of circularity in the margin area 10Y. This improves the magnetic permeability of the base body 10. Similarly, in at least one embodiment of the present invention, the second average degree of circularity in the core area 10X may be higher than the second average degree of circularity in the margin area 10Y.

In a case where the first average degree of circularity in the core area 10X differs from the first average degree of circularity in the margin area 10Y, the difference between the two is 5% or less of the first average degree of circularity in the core area 10X. In the base body 10, the difference between the first average degree of circularity in the core area 10X and the first average degree of circularity in the margin area 10Y is within a predetermined range (for example, 5% or less of the first average degree of circularity in the core area 10X). Therefore, the first metal magnetic particles 31 are homogeneously distributed in the base body 10. Similarly, in a case where the second average degree of circularity in the core area 10X differs from the second average degree of circularity in the margin area 10Y, the difference between the two is 5% or less of the second average degree of circularity in the core area 10X. In the base body 10, the difference between the second average degree of circularity in the core area 10X and the second average degree of circularity in the margin area 10Y is within a prescribed range (for example, 5% or less of the second average degree of circularity in the core area 10X). Therefore, the second metal magnetic particles 41 are homogeneously distributed in the base body 10. The first metal magnetic particles 31 and the second metal magnetic particles 41 are homogeneously distributed in the base body 10. This prevents magnetic flux from locally concentrating in some regions of the base body 10 when a current flows through the coil conductor 25. Furthermore, since the first metal magnetic particles 31 and the second metal magnetic particles 41 are homogeneously distributed in the base body 10, the filling rate of metal magnetic particles in the base body 10 can be increased.

In at least one embodiment of the present invention, the base body 10 may include a third metal magnetic particle that can easily deform along the surface shape of the first metal magnetic particle 31 and/or the second metal magnetic particle 41. The third metal magnetic particles intervene between the first metal magnetic particles 31, between the second metal magnetic particles 41, and/or between the first metal magnetic particle 31 and the second metal magnetic particle 41, thereby effectively improving a mechanical strength of the base body 10. In this case, the average degree of circularity of the plural third metal magnetic particles (referred to as "the third average degree of circularity") included in the base body 10 is lower than the second average degree of circularity.

In at least one embodiment of the present invention, the third average degree of circularity may be higher than the second average degree of circularity. In at least one embodiment of the present invention, the third average degree of circularity of the third metal magnetic particles may be 0.8 or higher. This can suppress lowering of the filling rate of metal magnetic particles in the base body 10 caused by agglutination of the second metal magnetic particles 41. In a case where the third average degree of circularity is higher than the second average degree of circularity, it is possible to shrink a surface area of the third metal magnetic particle, thereby suppressing agglutination of the third metal magnetic particles. This can suppress lowering of the filling rate of metal magnetic particles in the base body 10 caused by agglutination of the third metal magnetic particles.

Each of the plural metal magnetic particles included in the base body 10 may be joined to an adjacent metal magnetic particle via an insulating film. The insulating film may include oxide of a constituent element of the metal magnetic particle or may be made of an insulating material other than the constituent element of the metal magnetic particle.

The base body 10 may include a resin. The base body 10 may include a resin binding material that binds the metal magnetic particles. The binding material consists of, for example, thermosetting material having a good insulation property. The resin material used for a binding material has a smaller magnetic permeability than the first magnetic material. The resin material used for the binding material may be an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin. In at least one embodiment of the present invention, where the total of the mass of metal magnetic particles included in the base body 10 is 100 wt. %, a content proportion of resin in the base body 10 is from 1 to 3 wt. %.

Next, an example method for manufacturing the coil component 1 according to one embodiment of the present invention will now be described. Below is described an example method of manufacturing the coil component 1 using a compression molding method. The manufacturing method of the coil component 1 using a compression molding method includes a preparation step for mixing and kneading metal magnetic particles with a resin to produce a resin composition mixture, a compression molding step for compressing and molding the resin composition mixture into a molded body, and a heat treatment step for heating the molded body obtained in the compression molding step.

In the preparation step, first, a particle mixture of the first metal magnetic particle group including plural first metal magnetic particles 31 and the second metal magnetic particle group including plural second metal magnetic particles 41 is mixed and kneaded with a resin and a diluting solvent, thereby making a resin composition mixture. In a case where the base body 10 includes third metal magnetic particles, the particle mixture includes plural third metal magnetic particles. In at least one embodiment of the present invention, particles having an average degree of circularity of 0.9 or higher are used for raw material of the first metal magnetic particles 31, the second metal magnetic particles 41, and the third metal magnetic particles in the resin composition mixture. The average degree of circularity of the first metal magnetic particles 31, the second metal magnetic particles 41, and the third metal magnetic particles may be 0.9 or higher in the preparation step although the average degree of circularity may be lowered by deformation due to a compression force in the subsequent compression molding process.

Following this, in the compression molding process, the coil conductor 25, which is prepared in advance, is placed in a cavity of a mold, the mold having the coil conductor 25 therein is filled with the resin composition mixture made in the above manner, and an adequate molding pressure is applied to the resin composition mixture in the mold while the resin composition mixture is heated. In this manner, a molded body enclosing therein the coil conductor 25 is fabricated. In at least one embodiment of the present invention, the adequate molding pressure is 100 MPa or less. If the molding pressure is too high, the metal magnetic particles tend to be deformed to lower their degree of circularity. In an embodiment of the present invention, the molding pressure applied for fabricating the molded body may be 50 MPa or less, 40 MPa or less, or 30 MPa or less. If the molding pressure is too low, the filling rate of metal magnetic particles in the molded body is lowered. Therefore, a lower limit of the molding pressure may be set. In an embodiment of the present invention, the lower limit of the molding pressure applied for fabricating the molded body may be 10 MPa or 15 MPa.

After the molded body is obtained in the compression molding step, the manufacturing method proceeds to the heat treatment step. In the heat treatment step, the molded body obtained in the compression molding step is subjected to heat treatment. The base body 10 having the coil conductor 25 therein can be obtained by the heat treatment. The heat treatment causes the resin in the resin composition mixture to be cured to produce the binding material. The binding material binds the plural first metal magnetic particles 31 and the plural second metal magnetic particles 41. The heat treatment in the heat treatment step is performed at a cure temperature for the resin included in the resin composition mixture or at a temperature higher than the cure temperature. The heat treatment in the heat treatment step is performed at a temperature of, for example, 100 degrees Celsius to 200 degrees Celsius for 30 minutes to 240 minutes. In such a process for forming the base body 10, a low molding pressure in the range of 10 MPa to 100 MPa is applied. Accordingly, the first metal magnetic particles 31 and the second metal magnetic particles 41 are not subjected to a high molding pressure, which reduces stress strain generated in the first metal magnetic particles 31 and the second metal magnetic particles 41. Furthermore, the first metal magnetic particles 31 and the second metal magnetic particles 41 have a high degree of circularity. Therefore, in comparison with metal magnetic particles having a low degree of circularity (or metal magnetic particles having a degree of circularity lowered by a molding pressure), a frictional force acting on the first metal magnetic particles 31 and the second metal magnetic particles 41 in the resin composition mixture when the resin composition mixture including the first metal magnetic particles 31 and the second metal magnetic particles 41 is compressed is reduced. Therefore, the first metal magnetic particles 31 and the second metal magnetic particles 41 are easy to flow in the resin composition mixture during the compression molding, thereby allowing the first metal magnetic particles 31 and the second metal magnetic particles 41 to have a substantially closest packing structure in the mold. In this way, the degree of circularity of the first metal magnetic particles 31 and the second metal magnetic particles 41 is increased to a high degree, thereby suppressing lowering of the filling rate of metal magnetic particles in the base body 10 caused by a low molding pressure.

Next, a conductor paste is applied to both ends of the base body 10 obtained in the above-described manner, to form an external electrode 21 and an external electrode 22. The external electrode 21 is electrically connected to one end of the coil conductor 25 placed within the base body 10, and the external electrode 22 is electrically connected to the other end of the coil conductor 25 placed within the base body 10. The external electrode 21 and the external electrode 22 may include plated layers. The plated layer may include two or more layers. The two-layered plated layer may include a Ni plated layer and a Sn plated layer disposed on an outer side of the Ni plated layer. By the above-described process, the coil component 1 can be manufactured.

The manufactured coil component 1 may be mounted on the mounting substrate 2*a* using a reflow process. In this process, the mounting substrate 2*a* having the coil component 1 thereon passes at a high speed through a reflow furnace heated to, for example, a peak temperature of 260° C., and then the external electrodes 21, 22 are soldered to the corresponding land portions 3 of the mounting substrate 2*a*. In this way, the coil component 1 is mounted on the mounting substrate 2*a*, and thus the circuit board 2 is obtained.

Figure 5:
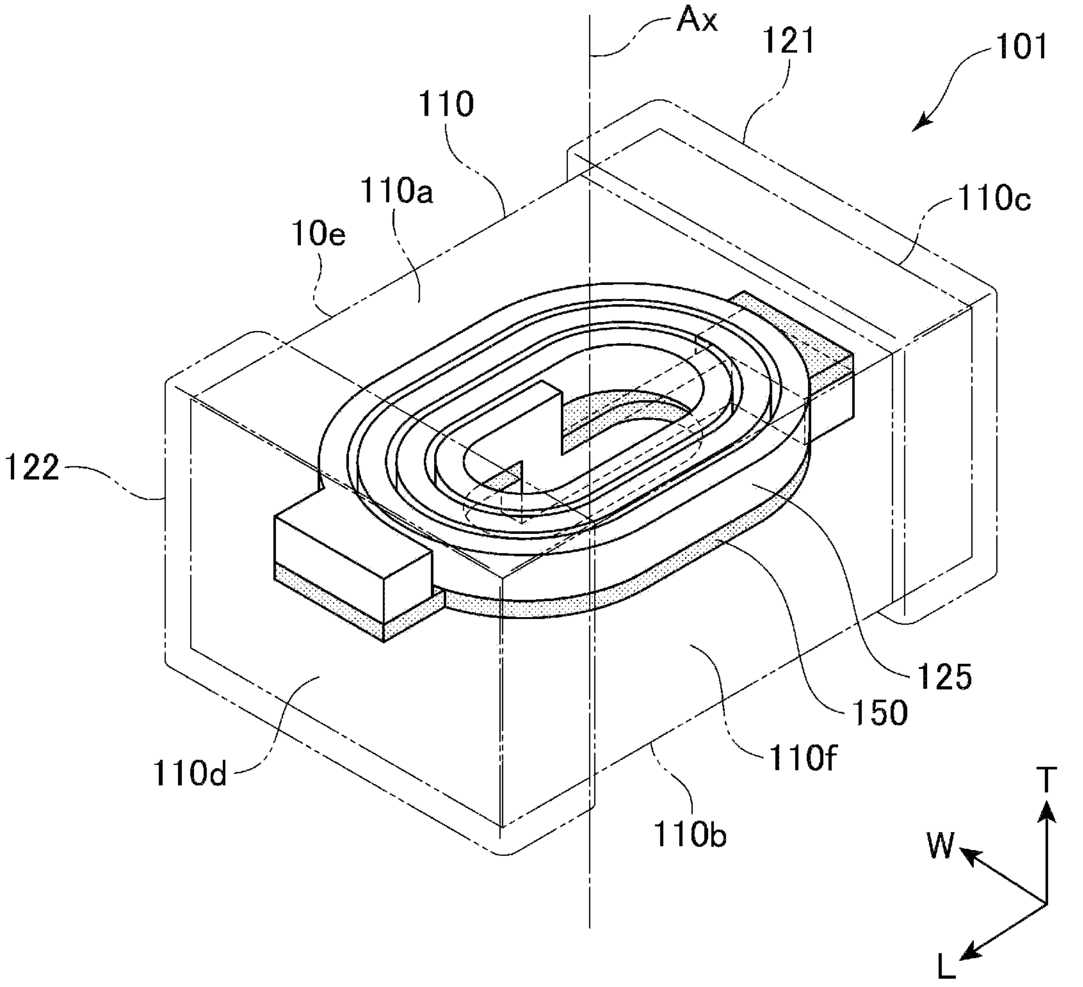
FIG. 5 is a perspective view schematically showing a coil component according to another embodiment of the present invention.

Next, a coil component 101 according to another embodiment of the present invention will be described with reference to FIG. 5. The coil component 101 is a planar coil. As shown, the coil component 101 includes a base body 110, an insulating plate 150 disposed in the base body 110, a coil conductor 125 disposed on a top surface of the insulating plate 150 in the base body 110, an external electrode 121 disposed in the base body 110, and an external electrode 122 disposed in the base body 110 and spaced apart from the external electrode 121. The base body 110 is formed of magnetic material similarly to the base body 10. The insulating plate 150 is formed of insulation material in a sheet shape.

The base body 110 is formed of magnetic material including plural metal magnetic particles similarly to the base body 10. The base body 110 in one embodiment includes plural first metal magnetic particles 31 and plural second metal magnetic particles 41. Also in the base body 110, the first average degree of circularity is 0.75 or higher, which represents an average degree of circularity of the plural first metal magnetic particles 31, and the second average degree of circularity is 0.8 or higher, which represents an average degree of circularity of the plural second metal magnetic particles 41. The average degree of circularity of the plural second metal magnetic particles 41 included in the base body 110 is higher than the average degree of circularity of the plural first metal magnetic particles 31 included in the base body 110. The base body 110 is formed in a substantially rectangular parallelepiped shape. The description on the base body 10 applies to the base body 110 wherever possible.

In the illustrated embodiment, the coil conductor 125 has a circling portion on the top surface of the insulating plate 150. The circling portion spirally extends around the coil axis Ax extending along the thickness direction (the T-axis direction). The coil conductor 125 is connected on one end to the external electrode 121 and is connected on the other end to the external electrode 122. The coil conductor 125 may have a shape other than the illustrated one. For example, the coil conductor 125 may have a circling portion spirally extending around the coil axis Ax on each of the top surface and the bottom surface of the insulating plate 150. In this configuration, the coil conductor 125 has a connection portion to connect between a circling portion disposed on the top surface of the insulating plate 150 and a circling portion disposed on the bottom surface of the insulating plate 150. The coil conductor 125 may have any shape other than the ones described in this specification unless inconsistency arises.

The following describes an example of a manufacturing method of the coil component 101. First, an insulating plate formed of insulation material in a sheet shape is prepared. Next, photoresist is applied to the top surface and bottom surface of the insulating plate 150, and then a development process is performed where a conductor pattern is exposed and transferred to each of the top surface and bottom surface of the insulating plate 150. Accordingly, resist having an opening pattern for forming the coil conductor 125 is formed on each of the top surface and bottom surface of the insulating plate 150.

Next, each of the opening patterns is filled with electrically conductive metal by plating. Then, etching is performed to remove the resist from the insulating plate 150, and as a result, the coil conductor 125 is formed on each of the top surface and bottom surface of the insulating plate 150. Furthermore, through holes formed through the insulating plate 150 are filled with electrically conductive metal to form vias connecting between the front side and the back side of the insulating plate 150 of the coil conductor 125.

Next, the base body 110 is formed on both sides of the insulating plate 150 formed with the above-described coil conductor 125. A compression molding is performed to form the base body 110. In the compression molding step, first, a particle mixture of the first metal magnetic particle group including plural first metal magnetic particles 31 and the second metal magnetic particle group including plural second metal magnetic particles 41 is mixed and kneaded with a resin and a diluting solvent, thereby making a resin composition mixture. Then, the resin composition mixture is applied in the form of a sheet onto a substrate such as a PET film. The applied resin composition mixture is dried to volatilize the diluting solvent. As a result, a sheet-like molded body is fabricated where plural first metal magnetic particles 31 and plural second metal magnetic particles 41 are dispersed in the resin. This sheet-like resin molded body will be referred to as a magnetic sheet. Two magnetic sheets are prepared, and the above-described coil conductor 125 is placed between the two magnetic sheets, which is applied with a pressure of 10 MPa to 100 MPa while being heated. As a result, a compressed molded body (a laminate body) having the coil conductor therein is fabricated.

The manufacturing method of the coil component 101 then proceeds to a heat treatment step. In the heat treatment step, the above-described laminate body is subjected to heat treatment. The base body 110 having the coil conductor 125 therein can be obtained by the heat treatment. The heat treatment causes the resin in the resin composition mixture to be cured to produce a binding material. The binding material binds the plural first metal magnetic particles 31 and the plural second metal magnetic particles 41. The heat treatment in the heat treatment step is performed at a cure temperature for the resin included in the resin composition mixture or at a temperature higher than the cure temperature. The heat treatment in the heat treatment step is performed at a temperature of, for example, 100 degrees Celsius to 200 degrees Celsius for 30 minutes to 240 minutes.

Another example will be described regarding a fabrication method of the laminate body in the above-described manufacturing method. In the other fabrication method of the laminate body, the insulating plate 150 formed with the coil conductor 125 is placed in a cavity of a mold, and the mold is filled with a resin composition mixture. The resin composition mixture is obtained by mixing and kneading a particle mixture of the first metal magnetic particle group including plural first metal magnetic particles 31 and the second metal magnetic particle group including plural second metal magnetic particles 41 with a resin and a diluting solvent. The resin composition mixture in the mold is applied with a molding pressure of 10 MPa to 100 MPa while being heated. As a result, a molded body having the coil conductor 125 therein is fabricated. The molded body is subjected to the above-described heat treatment. As a result, the base body 110 having the coil conductor 125 therein can be obtained.

Next, a conductor paste is applied to both ends of the base body 110 obtained in the above-described manner to form the external electrode 121 and the external electrode 122. The external electrode 121 is electrically connected to one end of the coil conductor 125 placed within the base body 110, and the external electrode 122 is electrically connected to the other end of the coil conductor 125 placed within the base body 110. By the above-described process, the coil component 101 can be manufactured.

Figure 6:
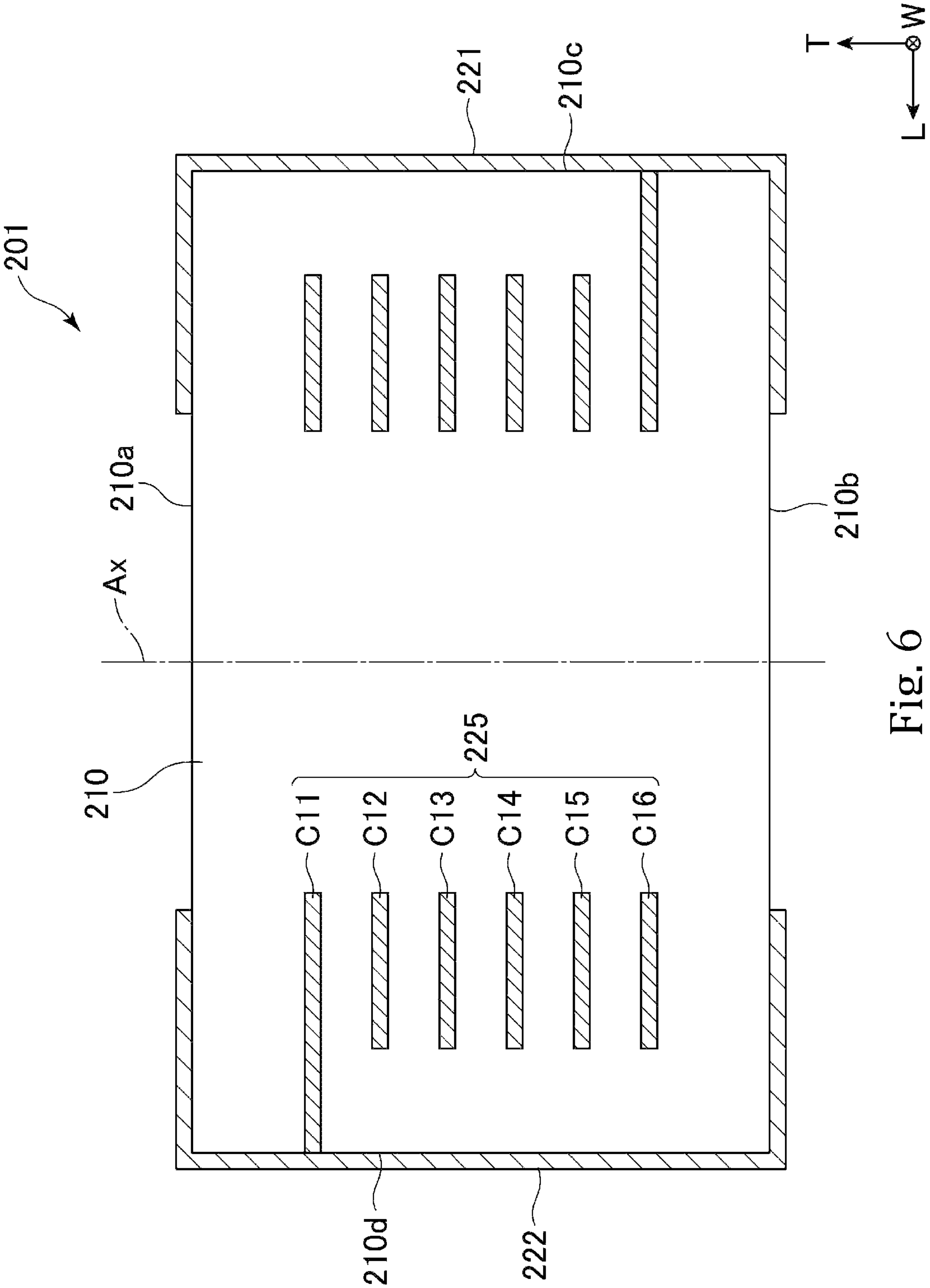
FIG. 6 is a cross sectional view schematically showing a coil component according to still another embodiment of the present invention.

Next, a coil component 201 according to another embodiment of the present invention will be described with reference to FIG. 6. The coil component 201 is a laminate coil. As shown, the coil component 201 includes a base body 210, a coil conductor 225 disposed in the base body 210, an external electrode 221 disposed on the base body 210, and an external electrode 222 disposed on the base body 210 and spaced apart from the external electrode 221. The base body 210 is formed of magnetic material similarly to the base body 10.

The base body 210 is formed of magnetic material including plural metal magnetic particles similarly to the base body 10. In at least one embodiment of the present invention, the base body 210 includes plural first metal magnetic particles 31 and plural second metal magnetic particles 41. Also in the base body 210, the first average degree of circularity is 0.75 or higher, which represents an average degree of circularity of the plural first metal magnetic particles 31, and the second average degree of circularity is 0.8 or higher, which represents an average degree of circularity of the plural second metal magnetic particles 41. The average degree of circularity of the plural second metal magnetic particles 41 included in the base body 110 is higher than the average degree of circularity of the plural first metal magnetic particles 31 included in the base body 110. The base body 210 is formed in a substantially rectangular parallelepiped shape. The description on the base body 10 applies to the base body 210 wherever possible.

The coil conductor 225 spirally extends around the coil axis Ax extending along the thickness direction (T-axis direction). The coil conductor 225 includes conductor patterns C11 to C16 and via conductors (not shown) connecting between adjacent ones of the conductor patterns C11 to C16. The via conductors extend substantially along the coil axis Ax. The conductor patterns C11 to C16 are formed by, for example, printing a conductive paste composed of metal or alloy having a good electrical conductivity on a sheet-like compressed molded body by screen printing. The material of the conductive paste may include Ag, Pd, Cu, Al, or alloy of these elements. Each of the conductor patterns C11 to C16 is electrically connected to an adjacent one of the conductor patterns via the via conductor. The conductor patterns C11 to C16 thus connected form the coil conductor 225 in a spiral form.

The following describes an example of a manufacturing method of the coil component 201. The coil component 201 may be manufactured by, for example, a lamination process. Below is described an example method of manufacturing the coil component 201 by the lamination process.

First, plural magnetic sheets composed of magnetic material are prepared. Each of the magnetic sheets can be produced as follows. A resin composition mixture is formed by mixing and kneading a particle mixture, which includes the first metal magnetic particle group including plural first metal magnetic particles 31 and the second metal magnetic particle group including plural second metal magnetic particles 41, with a thermally degradable resin as a binder (for example, polyvinyl butyral (PVB) resin) and a diluting solvent. The resin composition mixture thus obtained is applied in the form of a sheet onto a substrate such as a PET film. The applied resin composition mixture is dried to volatilize the diluting solvent. As a result, the magnetic sheet is fabricated where plural first metal magnetic particles 31 and plural second metal magnetic particles 41 are dispersed in the resin. The magnetic sheet thus fabricated is placed in a mold and applied with a pressure of 10 MPa to 100 MPa while being heated. Accordingly, a sheet-like compressed molded body is fabricated.

Next, a coil conductor is formed on the sheet-like compressed molded body as follows. First, through holes are formed at predetermined positions in the sheet-like compressed molded bodies so as to extend through the sheet-like compressed molded bodies in the T-axis direction. Then, a conductive paste is printed by screen printing on a top surface of each of the sheet-like compressed molded bodies, so that an unfired conductor pattern is formed on each of the sheet-like compressed molded bodies. The through-holes formed in the sheet-like compressed molded bodies are filled in with the conductive paste.

Next, a coil laminate is formed by stacking the compressed molded bodies. The compressed molded bodies are stacked such that adjacent ones of the unfired conductor patterns, which correspond to the conductor patterns C11 to C16 formed on the magnetic sheets, are electrically connected to each other via unfired vias.

Then, plural sheet-like compressed molded bodies are stacked to form an upper laminate to be an upper cover layer. Also, plural sheet-like compressed molded bodies are stacked to form a lower laminate to be a lower cover layer. Following this, the lower laminate, the coil laminate, and the upper laminate are stacked from a negative side to a positive side of the T-axis direction in this order. The stacked laminates are then thermally bonded to each other by a press to form a main body laminate. Instead of forming a lower laminate, a coil laminate, and an upper laminate, the main body laminate may be formed by stacking the prepared sheet-like compressed molded bodies one after the other and thermally compressing and bonding the stacked sheet-like compressed molded bodies all at once.

Then, the main body laminate is cut into a desired size by using a cutter such as a dicing machine or a laser processing machine to make a chip laminate. Next, the chip laminate is subjected to heat treatment. The heat treatment is performed at a temperature of, for example, 100 degrees Celsius to 200 degrees Celsius for 30 minutes to 240 minutes. The end portions of the chip laminate may be polished by barrel-polishing or the like, as necessary.

Then, a conductor paste is applied to both ends of the chip laminate to form the external electrode 221 and the external electrode 222. By the above-described process, the coil component 201 can be obtained.

Figure 7:
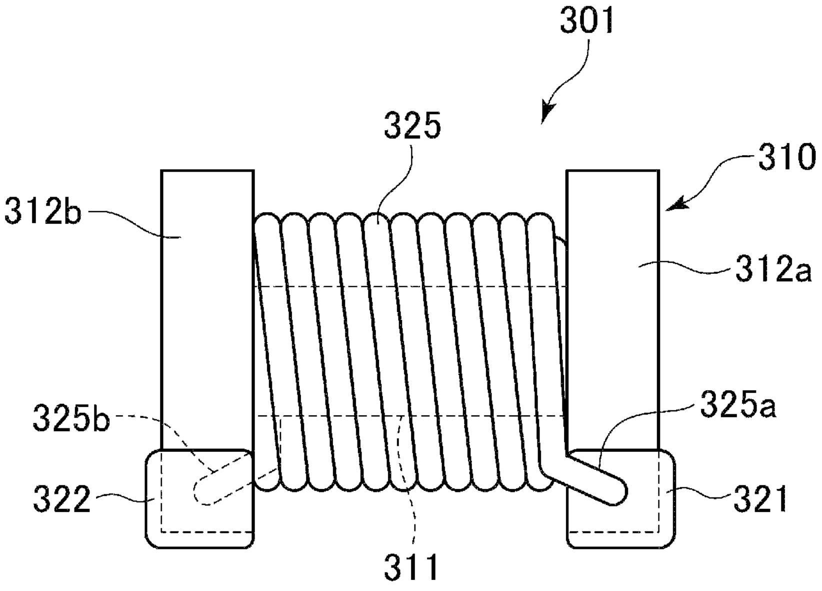
FIG. 7 is a front view schematically showing a coil component according to still another embodiment of the present invention.

Next, a coil component 301 according to another embodiment of the present invention will be described with reference to FIG. 7. The coil component 301 according one embodiment of the present invention is a winding coil. As shown, the coil component 301 includes a base body 310, a coil conductor 325 (winding coil 325), a first external electrode 321, and a second external electrode 322. The base body 310 includes a winding core 311, a flange 312*a* having a rectangular parallelepiped shape and disposed on one end of the winding core 311, and a flange 312*b* having a rectangular parallelepiped shape and disposed on the other end of the winding core 311. The coil conductor 325 is wound on the winding core 311. The coil conductor 325 includes a conductive wire made of a highly conductive metal material and an insulating layer covering and surrounding the conductive wire. The first external electrode 321 extends along the bottom surface of the flange 312*a*, and the second external electrode 322 extends along the bottom surface of the flange 312*b*.

The base body 310 is formed of magnetic material including plural metal magnetic particles similarly to the base body 10. The base body 310 in one embodiment includes plural first metal magnetic particles 31 and plural second metal magnetic particles 41. Also in the base body 310, the first average degree of circularity is 0.75 or higher, which represents an average degree of circularity of the plural first metal magnetic particles 31, and the second average degree of circularity is 0.8 or higher, which represents an average degree of circularity of the plural second metal magnetic particles 41. The average degree of circularity of the plural second metal magnetic particles 41 included in the base body 310 is higher than the average degree of circularity of the plural first metal magnetic particles 31 included in the base body 310. The description on the base body 10 applies to the base body 310 wherever possible.

The following describes an example of a manufacturing method of the coil component 301. First, the base body 310 is fabricated. The manufacturing method of the base body 310 includes a preparation step for preparing a resin composition mixture and a compression molding step for compressing and molding the resin composition mixture. In the preparation step, first, a particle mixture of the first metal magnetic particle group including plural first metal magnetic particles 31 and the second metal magnetic particle group including plural second metal magnetic particles 41 is mixed and kneaded with a resin and a diluting solvent, thereby making a resin composition mixture. The metal magnetic particles are dispersed in the resin composition mixture. The resin composition mixture is placed in a cavity of a mold, and the resin composition mixture in the mold is applied with a molding pressure of 10 MPa to 100 MPa while being heated. As a result, a molded body is fabricated.

Next, a heat treatment step is performed where the molded body obtained in the compression molding step is subjected to heat treatment. The base body 310 can be obtained by the heat treatment step. The heat treatment causes the resin in the resin composition mixture to be cured to produce a binding material. The binding material binds the plural first metal magnetic particles 31 and the plural second metal magnetic particles 41. The heat treatment is performed at a temperature of, for example, 100 degrees Celsius to 200 degrees Celsius for 30 to 240 minutes.

Next, a coil mounting step is performed where the coil conductor 325 is mounted in the base body 310 obtained by the above-described heat treatment. In the coil mounting step, the coil conductor 325 is wound around the base body 310, one end of the coil conductor 325 is connected to the first external electrode 321, and the other end is connected to the second external electrode 322. By the above-described process, the coil component 301 can be obtained.

EXAMPLES

Five types of coil components were produced as follows. The coil components are referred to as sample 1 to sample 5, respectively. For fabrication of the samples 1 to 5, first, Fe—Si—Cr crystalline alloy particles having an average particle size of 20 μm with degrees of circularity shown in Table 1 as "Large particle (Degree of circularity)" were prepared. Also, Fe—Si—Cr crystalline alloy particles having an average particle size of 4 μm with degrees of circularity shown in Table 1 as "Small particle (Degree of circularity)" were prepared. The degree of circularity can be derived from an average degree of circularity of ten sample metal magnetic particles extracted from the metal magnetic particles before being mixed. The average particle size can be derived from an average particle size of ten sample metal magnetic particles extracted from the metal magnetic particles before being mixed. The large particle is composed of 95 wt. % of Fe, 3.5 wt. % of Si, and 1.5 wt. % of Cr. The small particle is composed of 90.5 wt. % of Fe, 7.0 wt. % of Si, and 2.5 wt. % of Cr.

TABLE 1

| Sample number | Large particle (Degree of circularity) | Small particle (Degree of circularity) |
|---|---|---|
| 1 | 0.75 | 0.70 |
| 2 | 0.75 | 0.75 |
| 3 | 0.75 | 0.80 |
| 4 | 0.75 | 0.85 |
| 5 | 0.80 | 0.85 |

A particle mixture for each sample was obtained by mixing these two types of metal magnetic particles with a ratio of 70 wt. % of large particles to 30 wt. % of small particles. For example, for fabrication of the sample 1, a particle mixture was obtained to include 70 wt. % of large particles having an average degree of circularity of 0. 75 and 30 wt. % of small particles having an average degree of circularity of 0.70.

Then, the particle mixture for each sample was mixed and kneaded with an epoxy resin to make a resin composition mixture. Following this, a copper winding coil having on a surface thereof an insulating film, which was prepared in advance, was placed in a cavity of a mold. The mold having the winding coil therein was filled with the resin composition mixture made in the above manner. A molding pressure of 30 MPa was applied to the resin composition mixture in the mold. As a result, a molded body enclosing therein the coil conductor was fabricated. Then, the molded body fabricated in the above manner was subjected to heat treatment at 180 degrees Celsius for 120 minutes to cure the resin in the resin composition mixture. Accordingly, a base body including the coil conductor inside was produced.

Next, a conductor paste was applied to both ends of the base body obtained in the above-described manner to form the external electrode 21 and the external electrode 22. The coil components thus obtained are taken as the samples 1 to 5, respectively.

With respect to each of the samples 1 to 5 obtained in the above manner, inductance (μH) was measured using a commercially available B-H analyzer, self-resonant frequency was measured using a commercially available impedance analyzer, and specific electrical resistance was measured using a commercially available resistance meter.

The average degree of circularity of large particles and the average degree of circularity of small particles included in each of the samples 1 to 5 were obtained as follows. The coil component of each of the samples 1 to 5 was cut along the coil axis of the winding coil to expose a sectional surface. The sectional surface was photographed at 5000-fold and 20000-fold magnifications using a scanning electron microscope (SEM) to obtain plural SEM images. Then, SEM-EDS mapping was performed within the visual field of each of the plural SEM images to distinguish the large particles from the small particles. Then, of the plural SEM images, the SEM images photographed at 5000-fold magnification were analyzed using the Mac-View produced by Mountech Co., Ltd., to obtain a degree of circularity of each of the large particles included in the SEM images. An average of the obtained degrees of circularity was taken as the first average degree of circularity. Similarly, of the plural SEM images, the SEM images photographed at 20000-fold magnification were analyzed using the Mac-View to obtain a degree of circularity of each of the small particles included in the SEM image. An average of the obtained degrees of circularity was taken as the second average degree of circularity.

The measurement results and calculation results are shown in Table 2.

A technical effect of the above-described embodiments will now be described. According to at least one embodiment of the present invention, the first metal magnetic particle group has the first average degree of circularity of 0.75 or higher, and the second metal magnetic particle group has the second average degree of circularity higher than the first average degree of circularity. Therefore, stress strain generated in the first metal magnetic particles and the second metal magnetic particles is reduced. This can suppress reduction of the magnetic permeability of the base body 10 caused by stress strain generated in the metal magnetic particles. Furthermore, the first average degree of circularity of the first metal magnetic particle group and the second average degree of circularity of the second metal magnetic particle group are kept high. This reduces a contact area between the metal magnetic particles included in the first metal magnetic particle group and the second metal magnetic particle group. As a result, insulation breakdown is difficult to occur between the metal magnetic particles. Accordingly, the specific electrical resistance of the base body 10 can be increased in the embodiment of the present invention. Furthermore, stress strain generated in the first metal magnetic particles and the second metal magnetic particles is reduced, thereby reducing the core loss in the base body 10.

According to at least one embodiment of the present invention, the base body 10 includes the first metal magnetic particle group having the first average particle size and the second metal magnetic particle group having the second average particle size smaller than the first average particle size. Therefore, the second metal magnetic particles intervene between the first metal magnetic particles. This can increase the filling rate of metal magnetic particles in the base body 10.

TABLE 2

| Sample number | First average degree of circularity | Second average degree of circularity | Inductance [μH] | Specific electrical resistance [×10 ^ 6Ω · cm] | Resonance frequency [MHz] |
|---|---|---|---|---|---|
| 1 (Comparative example) | 0.75 | 0.70 | 0.98 | 0.6 | 25 |
| 2 (Comparative example) | 0.75 | 0.75 | 1.02 | 1 | 30 |
| 3 (Example) | 0.75 | 0.80 | 1.01 | 10 | 50 |
| 4 (Example) | 0.75 | 0.85 | 1.00 | 60 | 60 |
| 5 (Example) | 0.80 | 0.85 | 0.98 | 70 | 60 |

Based on the measurement results shown in Table 2, it was confirmed that if the average degree of circularity of large particles is 0.75 or higher and the average degree of circularity of small particles is higher than the average degree of circularity of large particles, the specific electrical resistance can be improved without deterioration of the inductance. It was also confirmed that improvement of the specific electrical resistance improves the resonance frequency.

It was confirmed that the average degree of circularity of the large particles and the average degree of circularity of the small particles in each of the samples 1 to 5 remain unchanged before and after a molding pressure is applied. As described above, a molding pressure of 30 MPa was applied in the compression process for fabrication of the base body of each sample. It can be considered that with a molding pressure of 100 MPa or less, it is possible to fabricate the base body without lowering the degree of circularity of metal magnetic particles.

According to at least one embodiment of the present invention, the first metal magnetic particle group has the first average degree of circularity of 0.75 or higher, and the plural second metal magnetic particle group has the second average degree of circularity higher than the first average degree of circularity. Therefore, the first metal magnetic particle and the second metal magnetic particle respectively have a small surface area according to their degree of circularity. Since the first metal magnetic particle and the second metal magnetic particle respectively have a small surface area according to their degree of circularity, agglutination of the metal magnetic particles can be suppressed in the base body 10. As a result, it is possible to suppress lowering of the filling rate of metal magnetic particles caused by agglutination of the metal magnetic particles. According to at least one embodiment of the present invention, the second metal magnetic particles having a smaller particle size have a higher degree of circularity than the first metal magnetic particles having a larger particle size. Therefore, it is possible to suppress agglutination of the second metal magnetic particles that are more likely to agglutinate than the first metal magnetic particles.

When a molding pressure is applied to the magnetic material including a particle mixture of the first metal magnetic particles having a larger particle size and the second metal magnetic particles having a smaller particle size, the molding pressure is more likely to be transmitted to the first metal magnetic particles having a larger particle size. According to at least one embodiment of the present invention, the hardness of the first metal magnetic particles 31 is larger than the hardness of the second metal magnetic particles 41. Therefore, it is possible to suppress deformation of the first metal magnetic particles 31 on which the molding pressure is more likely to act on.

According to at least one embodiment of the present invention, the weight proportion of the plural first metal magnetic particles 31 having a large particle size is larger than the weight proportion of the plural second metal magnetic particles 41 having a small particle size in the base body 10. Therefore, the magnetic permeability of the base body 10 can be further increased.

According to at least one embodiment of the present invention, the first metal magnetic particles 31 include Si, thereby reducing the magnetic crystalline anisotropy constant and the magnetostriction constant of the first metal magnetic particles 31. This can reduce the coercive force in the first metal magnetic particles 31 to decrease the hysteresis loss. Furthermore, the first metal magnetic particles 31 include Si, thereby increasing the electrical resistivity of the first metal magnetic particles 31. This can reduce the overcurrent loss in the first metal magnetic particles 31.

According to at least one embodiment of the present invention, the average degree of circularity of the first metal magnetic particles 31 included in the core area 10X where the density of magnetic flux generated by a current flowing through the coil conductor 25 is high is smaller than the average degree of circularity of the first metal magnetic particles 31 included in the margin area 10Y. This can further improve the magnetic permeability of the base body 10.

According to at least one embodiment of the present invention, the third metal magnetic particles fill a gap between the first metal magnetic particles, a gap between the second metal magnetic particles, and a gap between the first metal magnetic particle and the second metal magnetic particle. This can improve a mechanical strength of the base body.

According to at least one embodiment of the present invention, the third metal magnetic particles fill a gap between the first metal magnetic particles, a gap between the second metal magnetic particles, and a gap between the first metal magnetic particle and the second metal magnetic particle. This can increase the filling rate of metal magnetic particles in the base body 10.

The dimensions, material, and arrangement of the elements described above are not limited to those explicitly described for the embodiments. The elements are susceptible of modifications for desired dimensions, materials, and arrangements within the scope of the present invention.

Constituent elements not explicitly described herein can also be added to the above-described embodiments, and it is also possible to omit some of the constituent elements described for the embodiments.

The words “first,” “second,” and “third” used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

What is claimed is:

1. A coil component comprising:

a base body;

a coil conductor disposed in the base body, the coil conductor including a circling portion extending around a coil axis;

a first external electrode electrically connected to the coil conductor; and a second external electrode electrically connected to the coil conductor, wherein the base body includes a first metal magnetic particle group and a second metal magnetic particle group, the first metal magnetic particle group is composed of plural first metal magnetic particles each including Fe, the second metal magnetic particle group is composed of plural second metal magnetic particles each including Fe, the first metal magnetic particle group has a first average particle size and a first average degree of circularity of 0.75 or higher in a cross section of the base body cut along the coil axis, the second metal magnetic particle group has a second average particle size smaller than the first average particle size and a second average degree of circularity larger than the first average degree of circularity in the cross section, the base body includes a core area on a radially inner side of the circling portion and a margin area on a radially outer side of the circling portion, and the first average degree of circularity in the core area is larger than the first average degree of circularity in the margin area.

2. The coil component according to claim 1, wherein a strength of each of the plural second metal magnetic particles is larger than a strength of each of the plural first metal magnetic particles.

3. The coil component according to claim 1, wherein the first average particle size is equal to or larger than quintuple of the second average particle size.

4. The coil component according to claim 1, wherein a weight proportion of the plural first metal magnetic particles in the base body is larger than a weight proportion of the plural second metal magnetic particles in the base body.

5. The coil component according to claim 1, wherein each of the plural first metal magnetic particles includes Si.

6. The coil component according to claim 5, wherein each of the plural second metal magnetic particles includes Si, and a content proportion of Si included in the plural first metal magnetic particles is higher than a content proportion of Si included in the plural second metal magnetic particles.

7. The coil component according to claim 1, wherein the base body includes a resin.

8. The coil component according to claim 1, wherein the second average degree of circularity in the core area is larger than the second average degree of circularity in the margin area.

9. The coil component according to claim 1, wherein the base body includes a third metal magnetic particle group composed of plural third metal magnetic particles each including Fe, the third metal magnetic particle group having a third average particle size smaller than the second average particle size.

10. The coil component according to claim 9, wherein the plural third metal magnetic particles have a third average degree of circularity lower than the second average degree of circularity.

11. A circuit board comprising:

the coil component according to claim 1; and a mounting substrate connected to the first external electrode and the second external electrode by soldering.

12. An electronic device comprising the circuit board according to claim 11.

13. The coil component according to claim 1, wherein the second average degree of circularity is 0.8 or higher.

14. The coil component according to claim 1, wherein the base body includes a third metal magnetic particle group composed of plural third metal magnetic particles each including Fe, the plural third metal magnetic particles have a third average degree of circularity higher than the second average degree of circularity.

* * * * *